United States Patent
Beiter (10) Patent No.: US 10,218,703 B2
(45) Date of Patent: Feb. 26, 2019

(54) DETERMINING A PERMISSION OF A FIRST TENANT WITH RESPECT TO A SECOND TENANT

(71) Applicant: Hewlett-Packard Development Company, L.P., Houston, TX (US)

(72) Inventor: Michael B Beiter, Fort Collins, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 187 days.

(21) Appl. No.: 15/112,394

(22) PCT Filed: Jan. 20, 2014

(86) PCT No.: PCT/US2014/012177
§ 371 (c)(1),
(2) Date: Jul. 18, 2016

(87) PCT Pub. No.: WO2015/108539
PCT Pub. Date: Jul. 23, 2015

(65) Prior Publication Data
US 2016/0337365 A1 Nov. 17, 2016

(51) Int. Cl.
*H04L 29/06* (2006.01)
*G06F 9/46* (2006.01)
*H04L 29/08* (2006.01)

(52) U.S. Cl.
CPC ............ *H04L 63/101* (2013.01); *G06F 9/468* (2013.01); *H04L 63/102* (2013.01); *H04L 67/16* (2013.01)

(58) Field of Classification Search
CPC ............................. H04L 63/101; H04L 63/102
See application file for complete search history.

(56) References Cited

U.S. PATENT DOCUMENTS 6,397,125 B1 5/2002 Goldring et al.
7,630,974 B2 12/2009 Remahl et al.
(Continued)

FOREIGN PATENT DOCUMENTS

CN 103067406 4/2013
CN 103312721 9/2013
(Continued)

OTHER PUBLICATIONS

Bo Tang et al: "Multi-tenancy authorization models for collaborative cloud services", 2013 International Conference on CTS, IEEE, May 28, 2013, pp. 132-138.
(Continued)

*Primary Examiner* — Ali Shayanfar
(74) *Attorney, Agent, or Firm* — HP Inc. Patent Department (57) ABSTRACT

A first representation is provided of privileges among a plurality of tenants of a system. The tenants have relationships according to a hierarchy that includes multiple hierarchical levels of the tenants, where at least one of the privileges specifies a permission of a first tenant to perform a task with respect to a second tenant. The first representation is independent of a representation of the relationships among the plurality of tenants. In response to a request from the first tenant to perform a task with respect to the second tenant, a system determines, based on the first representation, whether the first tenant is permitted to perform the task with respect to the second tenant.

19 Claims, 6 Drawing Sheets

(56) References Cited

U.S. PATENT DOCUMENTS

| | | | |
|---|---|---|---|
| 7,730,523 B1 * | 6/2010 | Masurkar | H04L 63/168 726/4 |
| 7,970,791 B2 | 6/2011 | Liao et al. | |
| 7,996,883 B2 | 8/2011 | Chin et al. | |
| 8,132,231 B2 | 3/2012 | Amies et al. | |
| 8,434,129 B2 | 4/2013 | Kannappan et al. | |
| 8,447,829 B1 | 5/2013 | Geller et al. | |
| 8,555,055 B2 | 10/2013 | Grebenik et al. | |
| 9,405,532 B1 * | 8/2016 | Sullivan | G06F 8/71 |
| 9,646,019 B2 * | 5/2017 | Factor | G06F 21/6218 |
| 9,774,586 B1 * | 9/2017 | Roche | H04L 63/08 |
| 2004/0243822 A1 | 12/2004 | Buchholz et al. | |
| 2008/0189617 A1 | 8/2008 | Covell et al. | |
| 2010/0306393 A1 | 12/2010 | Appiah et al. | |
| 2011/0126275 A1 | 5/2011 | Anderson et al. | |
| 2011/0225167 A1 | 9/2011 | Bhattacharjee et al. | |
| 2011/0231899 A1 | 9/2011 | Pulier et al. | |
| 2012/0136936 A1 | 5/2012 | Quintuna | |
| 2012/0143951 A1 | 6/2012 | Hacigumus et al. | |
| 2012/0151568 A1 | 6/2012 | Pieczul et al. | |
| 2012/0173725 A1 | 7/2012 | Verma | |
| 2012/0179646 A1 | 7/2012 | Hinton et al. | |
| 2012/0191760 A1 | 7/2012 | Kaufman et al. | |
| 2012/0233522 A1 | 9/2012 | Barton et al. | |
| 2013/0019276 A1 | 1/2013 | Biazetti et al. | |
| 2013/0041872 A1 | 2/2013 | Aizman et al. | |
| 2013/0060839 A1 | 3/2013 | Van Biljon et al. | |
| 2013/0091171 A1 | 4/2013 | Lee | |
| 2013/0139172 A1 | 5/2013 | An et al. | |
| 2013/0144945 A1 | 6/2013 | Said et al. | |
| 2013/0185431 A1 | 7/2013 | Venkatesh et al. | |
| 2013/0185436 A1 | 7/2013 | Carlin et al. | |
| 2013/0227560 A1 | 8/2013 | McGrath et al. | |
| 2013/0227658 A1 | 8/2013 | Leicher et al. | |
| 2013/0246475 A1 * | 9/2013 | Kuruganti | G06F 17/30575 707/785 |
| 2013/0254539 A1 | 9/2013 | Auradkar et al. | |
| 2013/0275379 A1 | 10/2013 | Trebas et al. | |
| 2014/0007178 A1 * | 1/2014 | Gillum | G06F 21/00 726/1 |
| 2014/0007189 A1 * | 1/2014 | Huynh | G06F 3/0622 726/3 |
| 2015/0089575 A1 * | 3/2015 | Vepa | H04L 41/0893 726/1 |
| 2016/0142868 A1 * | 5/2016 | Kulkarni | H01Q 1/24 455/456.5 |

FOREIGN PATENT DOCUMENTS

| | | |
|---|---|---|
| WO | WO-20030998483 A1 | 11/2003 |
| WO | WO-2015108536 | 7/2015 |
| WO | WO-2015108537 | 7/2015 |
| WO | WO-2015108538 | 7/2015 |

OTHER PUBLICATIONS

Calero et al: "Toward a Multi-Tenancy Authorization System for Cloud Services", Security 8L Privacy, IEEE, vol. 8, No. 6, Nov. 1/Dec. 2010, pp. 48-55.

Tang et al: "A multi-tenant RBAC model for collaborative cloud services", Conference on Privacy, Security and Trust, IEEE, Jul. 2013, 229-238.

Gigya, "Accounts API ~ Gigya's Documentation," (Webpage), retrieved on Dec. 18, 2013, 7 pages.

Gigya, "Identify Storage ~ Gigya's Documentation," (Webpage) retrieved on Dec. 18, 2013, 5 pages.

Gigya, "Identify Storage," (Webpage), retrieved on Dec. 18, 2013, 3 pages.

Gigya, User Management 360, Gigya's Documentation retrieved on Dec. 18, 2013, 3 pages.

Hitachi ID Systems Inc., "Privileged Access Manager Product Q&A," (Web Page), Dec. 14, 2011, 10 pages ~ http://hitachi-id.com/.

IBM, "IBM Lotus Domino 8.5 Administrator Versions 8.5 and 8.5.1, How replication works in a cluster" (Web Page), Oct. 5, 2009, 3 pages ~ http://publib.boulder.ibm.com/.

Identropy, "Smart Identity Management," (Web Page), Jan. 9, 2013, 2 pages, available at http://www.identropy.com/smart-idm/.

Netiq, "Lightning-fast administration for greater agility," (Web Page), Oct. 15, 2010, 2 pages ~ http://www.netiq.com/.

Oracle, "Data Replication," Oracle Solaris Cluster Geographic Edition Overview, Solaris Cluster 4.0, 2012, 2 pages ~ http://doc.oracle.com/.

Sample, N. et al, "Indexing Open Schemas," (Research Paper), Jun. 15, 2002, 13 pages ~ http://infolab.stanford.edu/.

Shi, K. et al., "Zone-Based Replication Scheme for Mobile Ad Hoc Networks Using Cross-Layer Design," (Web Page), 26, pp. 698-710 ~ http://link.springer.com/.

VCE Company, "VBLOCK™ Solution for Trusted Multi-Tenancy: Design Guide," (Research Paper), Mar. 20, 2013, 143 pages ~ http://www.vce.com/.

* cited by examiner

DETERMINING A PERMISSION OF A FIRST TENANT WITH RESPECT TO A SECOND TENANT

BACKGROUND

A cloud system includes resources or services that can be shared by customers of a provider of the cloud system. Resources can include processing resources, storage resources, communication resources, and so forth. Services can be provided by applications or other machine-executable instructions. The cloud system allows its resources or services to be accessed by customers on-demand.

BRIEF DESCRIPTION OF THE DRAWINGS

Some implementations are described with respect to the following figures.

DETAILED DESCRIPTION

The infrastructure of a cloud system can be owned by or managed by a provider, which can be an entity such as a business concern, government agency, educational organization, or individual. The infrastructure of the cloud system can be located at a particular geographic site, or can be distributed across multiple geographic sites. The infrastructure includes cloud resources and cloud services that are made available to customers of the provider of the cloud system. Such customers, which are also referred to as tenants, can be located anywhere, so long as they are able to access the cloud system over a network. A tenant can refer to an individual user or a collection of users, such as users who are members of a business concern, a government agency, or an educational organization.

Cloud resources can include any one or some combination of the following: processing resources (which can include processors of one or multiple computers), storage resources (which can include storage devices such as disk-based storage devices or solid state storage devices), communication resources (which can include communication devices to allow communications by users, where examples of communication devices can include routers, switches, communication establishment servers, etc.), and other resources.

In addition to cloud resources, the cloud system can also provide cloud services, such as web services, that can be invoked by users of tenants of the cloud system. A user of a tenant can refer to a machine or a human. A cloud service refers to a functionality that can be invoked by a tenant. The functionality can be provided by machine-readable instructions. A web service refers to a service that is accessible over a network, such as the Internet.

Although reference is made to a cloud system in the present discussion, it is noted that techniques or mechanisms according to some implementations are also applicable to other types of systems that can include resources and/or services that can be shared by multiple tenants.

A cloud system can include an identity management system that stores information to enable authentication of users attempting to access the cloud system, and authorization of access to requested resources or services of the cloud system. Other entities can interact with the identity management system to perform the authorization and authentication. The identity management system can define privileges relating to the access of the resources and services of the cloud system. A privilege can refer to the permission of a given user to perform an action, which can involve accessing a resource or service of the cloud system.

The identity management system also provides privileges associated with the ability to create, read, update, or delete profile information of users. The profile information of a user maintained by the identity management system can include various types of user data, including a user's name, email address, login name (for logging into the cloud system), one or multiple authentication credentials that allow a user to access the cloud system (examples of an authentication credential can include a password, biometric information of the user, a secure key, and so forth), and so forth.

A "multi-tenant" identity management system is an identity management system that is able to perform identity management for multiple tenants, such as multiple tenants of a cloud system.

In some implementations, the multi-tenant identity management system can also store tenant information and tenant relationship information. Tenant information includes information describing a tenant, where the information can include a name of the tenant, products or services provided by the tenant, and other information relating to the tenant. Tenant relationship information describes relationships among the tenants. For example, a first tenant may be a manufacturer of various products. A second tenant may be a reseller for the first tenant, where the second tenant sells certain products of the first tenant. A third tenant can be a customer of the second tenant. In the foregoing example, the second tenant can be considered to be a sub-tenant of the first tenant, and the third tenant can be considered to be a sub-tenant of the second tenant. A sub-tenant relationship between tenants can also be referred to as a tenant-of-tenant relationship. A tenant-of-tenant relationship can refer to a relationship that has been established between tenants, where this relationship can be established by an agreement, established based on a corporate arrangement (e.g. a subsidiary of a parent), or established by any other type of arrangement or understanding.

Depending upon specific services offered among the tenants or specific interactions of the tenants, one tenant may have access to a tenant resource of another tenant. A tenant resource can include information of a tenant, a processing resource of the tenant, a storage resource of the tenant, a communication resource of a tenant, and so forth. Note that a tenant resource of a tenant is distinct from a cloud resource of a cloud system.

In an example, a reseller may provide advanced services, such as maintenance services, support services, and so forth, to customers of the reseller. In such a relationship, the reseller can have partial or full access of information of the reseller's customers. In another example, if a reseller does not provide any advanced services to a particular customer (e.g. the reseller merely sells products to the particular customer with no further services offered after the sale of the products), then the reseller may not be permitted to have access to information of the particular customer.

The ability of one tenant to access a resource of another tenant is indicated in tenant privilege information. The tenant privilege information can specify what privileges one tenant has with respect to another tenant. Traditionally, privileges among tenants may be implied from tenant-to-tenant relationships. For example, one tenant has access to a sub-tenant's information, but not information of another tenant. However, specifying privileges among tenants in this static manner reduces flexibility in the granting of privileges among tenants.

In accordance with some implementations, techniques or mechanisms are provided to manage tenant-to-tenant privileges in a multi-tenant environment where the tenants have relationships in a hierarchy that includes multiple different hierarchical levels. In a tenant-to-tenant relationship hierarchy, a tenant at a top level of the hierarchy can have one or multiple sub-tenants at a second, lower hierarchical level. A tenant at the second hierarchical level can in turn have sub-tenants at a third, lower hierarchical level of the tenant-to-tenant relationship hierarchy.

An explicit tenant privilege representation of privileges among multiple tenants can be provided. This tenant privilege representation is in addition to and is independent of a representation of relationships among the multiple tenants. Thus, the representation of privileges among tenants does not have to depend upon the relationships among the tenants. In this manner, the representation of privileges among the tenants can be dynamically modified on an on-going basis, irrespective of whether or not relationships among tenants have been modified.

Examples of privileges among tenants that can be specified in the tenant privilege representation can include the following, as examples:
  add a new sub-tenant to a tenant;
  remove a sub-tenant from a tenant;
  access a resource of a tenant, where the resource can include information contained in a tenant record of the particular tenant, or any other resource associated with the particular tenant, such as a processing resource, storage resource, communication resource, and so forth;
  access information contained in an identity management system that is associated with a tenant (the information contained in the identity management system includes user identity data that is used by the identity management system to authenticate a user or to authorize access of a cloud resource or cloud service of a cloud system); or
  access information contained in an external system that is associated with a tenant, where the external system can be a document repository or other external system.

More generally, the tenant privilege representation specifies permissions of the tenants at respective hierarchical levels to perform tasks (such as any of the foregoing, for example) with respect to other tenants at respective hierarchical levels.

Figure 1:
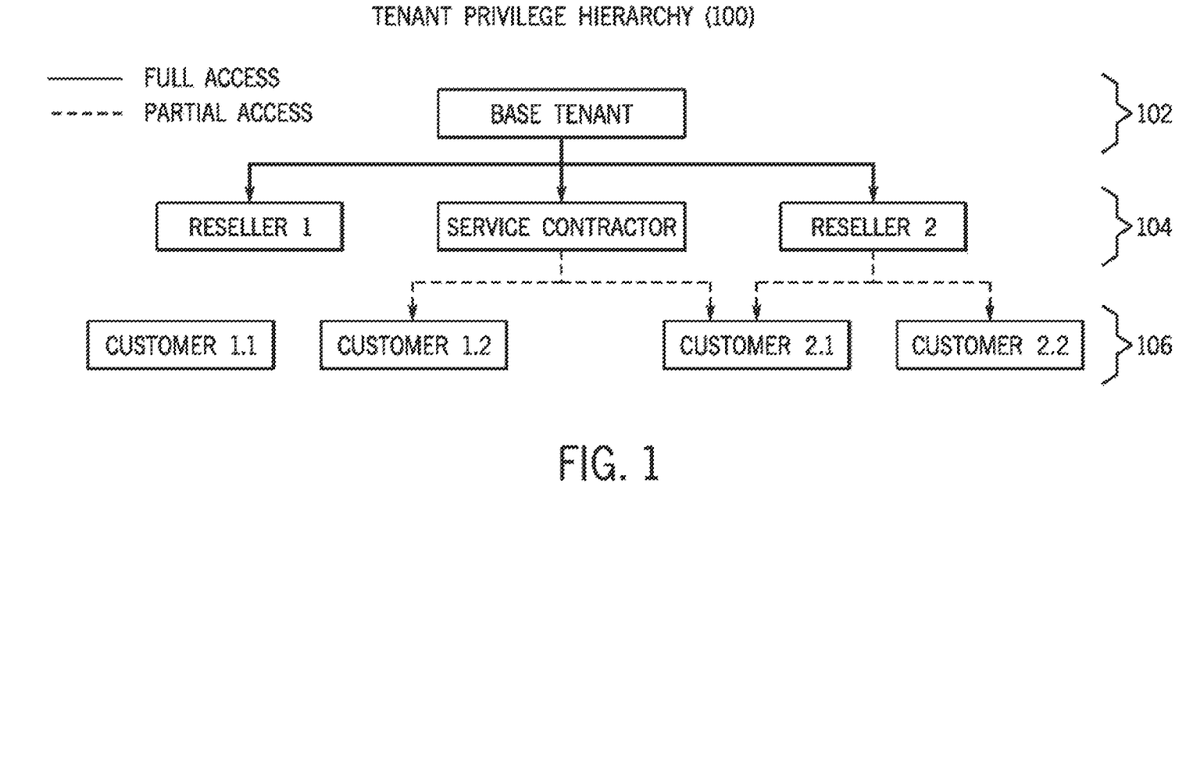
FIG. 1 is a schematic diagram of a tenant privilege hierarchy, according to some implementations.

FIG. 1 is an example of a tenant privilege representation of privileges among tenants, where an arrow from a first tenant to a second tenant indicates that a certain privilege has been granted from the first tenant to the second tenant. The tenant privilege representation depicted in FIG. 1 is a tenant privilege hierarchy 100. A base tenant is located at a first (top) hierarchical level 102 of the tenant privilege hierarchy 100. In some examples, the base tenant can be a manufacturer of products or a provider of services. Sub-tenants of the base tenant are located at the next hierarchical level 104 of the tenant privilege hierarchy 100, where the sub-tenants include reseller 1, reseller 2, and a service contractor. Further sub-tenants of the tenants at the second hierarchical level 104 are located at the next lower hierarchical level 106. The tenants at the hierarchical level 106 include customer 1.1, customer 1.2, customer 2.1, and customer 2.2. Customers 1.1 and 1.2 are sub-tenants of reseller 1, while customers 2.1 and 2.2 are sub-tenants of reseller 2.

Although three hierarchical levels 102, 104, and 106 are depicted in FIG. 1, it is noted that a different tenant privilege hierarchy can include a different number of hierarchical levels (e.g. less than 3 or greater than 3).

In the tenant privilege hierarchy 100 of FIG. 1, the base tenant is granted privileges (such as those listed further above) with respect to each of its sub-tenants, including reseller 1, the service contractor, and reseller 2. Moreover, reseller 2 is granted privileges with respect to customer 2.1 and customer 2.2. Although there is no tenant-to-tenant relationship between the service contractor and customers 1.2 and 2.1, privileges are granted to the service contractor with respect to the customers 1.2 and 2.1, since customers 1.2 and 2.1 may have elected to employ services of the service contractor.

Note that in FIG. 1, no privilege relationship is specified between reseller 1 and its customers 1.1 and 1.2. As a result, the reseller 1 is not granted any privileges with respect to customers 1.1 and 1.2.

Although the example tenant privilege hierarchy 100 shows tenants at higher hierarchical levels being granted privileges with respect to tenants at lower hierarchical levels, it is noted that in further examples, a lower-level tenant may be granted a privilege with respect to a higher-level tenant. For example, customer 2.1 may be granted a privilege with respect to reseller 2. Also, in additional examples, a first tenant at a given hierarchical level may be granted a privilege with respect to a second tenant at the same given hierarchical level.

In further examples, a privilege relationship can also be established between the base tenant and tenants that are more than one hierarchical level away from the base tenant. For example, a privilege relationship can be established between the base tenant and each of the customers 1.1, 1.2, 2.1, and 2.2, to allow the base tenant to have privileges with respect to the customers.

FIG. 1 also depicts a "full access" privilege (represented by a solid arrow) and a "partial access" privilege (represented by a dashed arrow). In the example of FIG. 1, the base tenant has a full access privilege with respect to each of the base tenant's sub-tenants, including reseller 1, the service contractor, and reseller 2. The full access privilege specifies that the base tenant has all possible privileges, including all of the example privileges listed further above, for example. The example tenant privilege hierarchy of FIG. 1 specifies that the service contractor has partial access privileges with respect to customers 1.2 and 2.1, and reseller 2 has partial access privileges with respect to customers 2.1 and 2.2. A partial access privilege indicates that a tenant has less than all available privileges with respect to another tenant. Note that for a first tenant that has multiple sub-tenants, the tenant privilege hierarchy 100 may specify different privileges of the first tenant with respect to the respective multiple sub-tenants.

Figure 2:
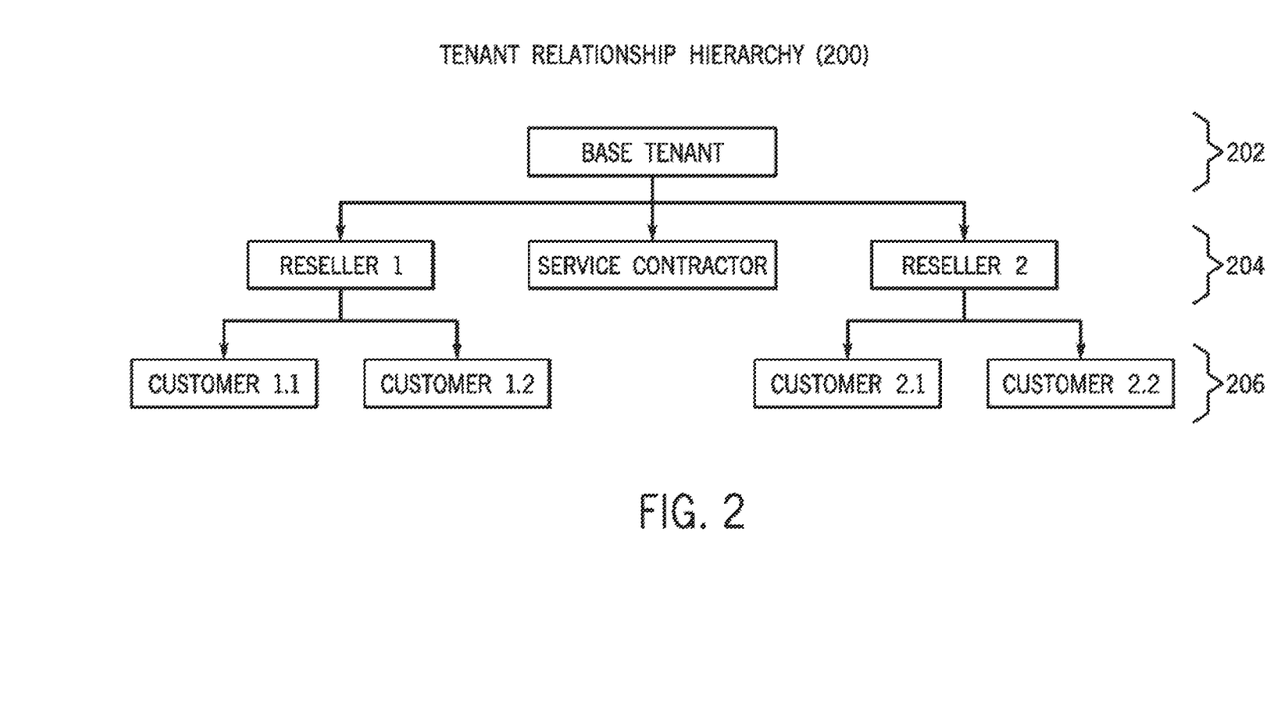
FIG. 2 is a schematic diagram of a tenant relationship hierarchy, according to some implementations.

FIG. 2 shows a tenant relationship representation of the relationships among the tenants depicted in FIG. 1. The tenant relationship representation can be in the form of a tenant relationship hierarchy 200, in some examples. An arrow from a first tenant to a second tenant indicates that the second tenant is a sub-tenant of the first tenant. The tenant relationship hierarchy 200 has multiple hierarchical levels 202, 204, and 206. The base tenant is at the top hierarchical level 202, reseller 1, the service contractor, and reseller 2 are at the second hierarchical level 204, and customers 1.1, 1.2, 2.1, and 2.2 are at the third hierarchical level 206.

In other examples, the tenant relationship hierarchy 200 can include a different number of hierarchical levels.

In the tenant relationship hierarchy 200, customers 1.1 and 1.2 are sub-tenants of reseller 1, and customers 2.1 and 2.2 are sub-tenants of reseller 2. Note, however, that customers 1.1, 1.2, 2.1, and 2.2 are not sub-tenants of the service contractor. Even though there is no tenant-to-tenant relationship between the service contractor and the customers in the tenant relationship hierarchy 200, the tenant privilege hierarchy 100 of FIG. 1 allows a privilege relationship to be established between the service contractor and customers 1.2 and 2.1.

Figure 3:
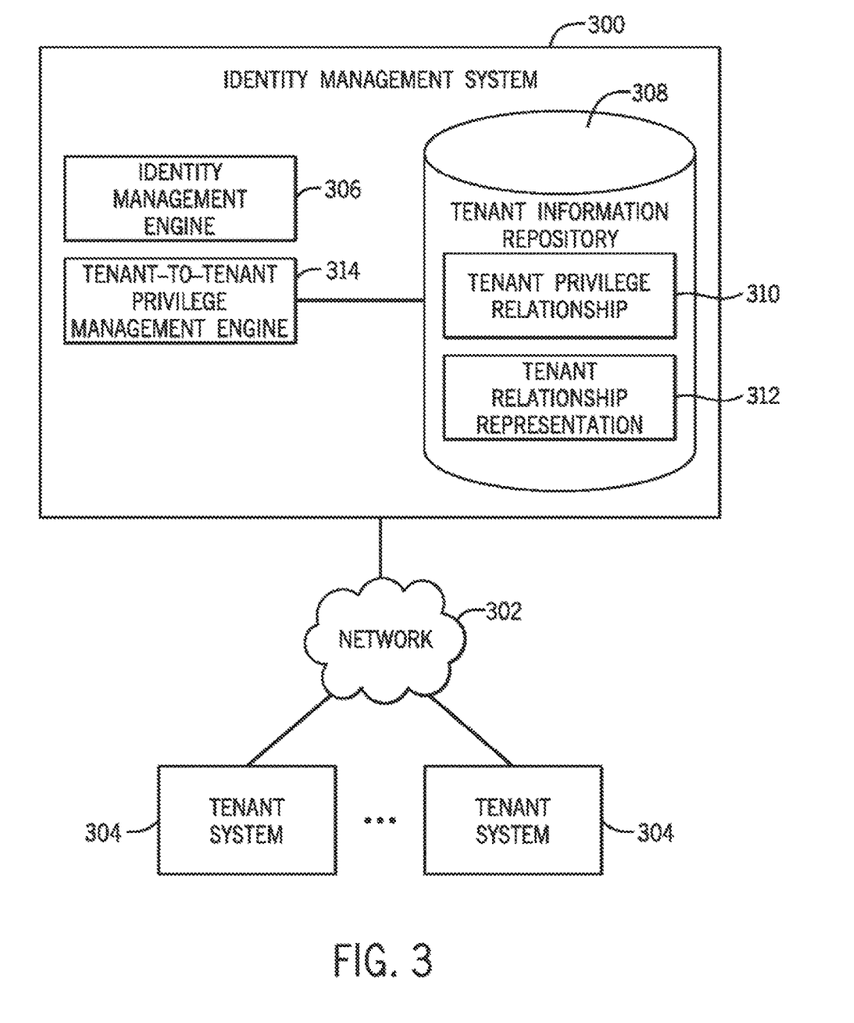
FIG. 3 is a block diagram of an example arrangement that includes an identity management system and tenant systems, according to some implementations.

FIG. 3 shows an example arrangement that includes an identity management system 300 that is coupled over a network 302 to tenant systems 304. A tenant system refers to a system associated with a tenant. The system can include one or multiple computers and possibly other devices.

The identity management system 300 can be part of a cloud system (depicted in FIG. 4) that has cloud resources and/or cloud services accessible by the tenant systems 304. Access to the cloud resources and/or cloud services by a tenant system is controlled by the identity management system 300. The identity management system 300 includes an identity management engine 306, which can use profile information of users (not shown) to authenticate users of tenants, and to determine whether or not the users are permitted to access the cloud resource(s) and/or cloud service(s) of the cloud system.

The identity management system 300 also includes a tenant information repository 308, which stores a tenant privilege representation 310 of privileges among tenants (e.g. the tenant privilege hierarchy 100 of FIG. 1), and a tenant relationship representation 312 of relationships among tenants (e.g. the tenant relationship hierarchy 200 of FIG. 2).

Although the representations 310 and 312 are depicted as being part of the same repository 308, it is noted in other examples, the representations 310 and 312 can be stored in separate repositories.

The identity management system 300 includes a tenant-to-tenant privilege management engine 314, which has access to the tenant information repository 308. The tenant-to-tenant privilege management engine 314 is able to access the tenant privilege representation 310 to determine whether a privilege relationship exists between specific tenants. The tenant-to-tenant privilege management engine 314 is able to access the tenant relationship representation 312 to determine whether a tenant-of-tenant relationship exists between specific tenants.

The tenant-to-tenant privilege management engine 314 is able to update the tenant relationship representation 312. In an example, if a particular privilege relationship indicates that a first tenant is able to add a sub-tenant to a second tenant, then the tenant-to-tenant privilege management engine 314 would allow the first tenant to add the sub-tenant to the second tenant, which would cause a modification of the tenant relationship representation 312 (the new sub-tenant of the second tenant would be added to the tenant relationship representation 312).

The tenant privilege representation 310 can be modified by the tenant-to-tenant privilege management engine 314 on a dynamic basis. For example, an administrator of the identity management system 300 may decide to add a privilege, modify a privilege, or delete a privilege between specific tenants, which can be accomplished by modifying the tenant privilege representation 310. Note that the tenant privilege representation 310 can be changed without having to change the tenant relationship representation 312.

Each of the engines (including engines 306 and 314, for example) of the identity management system 300 may be any combination of hardware and programming to implement the functionalities of the respective engine. Such combinations of hardware and programming may be implemented in a number of different ways. For example, the programming for an engine may include executable instructions stored on a non-transitory machine-readable storage medium and the hardware for the engine may include processor(s) to execute those instructions. In such examples, the machine-readable storage medium may store instructions that, when executed by the processor(s), implement functionalities of the engine. The machine-readable storage medium storing the instructions may be integrated in a computing device including the processing resource to execute the instructions, or the machine-readable storage medium may be separate but accessible to the computing device and the processing resource. The processing resource may include one processor or multiple processors included in a single computing device or distributed across multiple computing devices. In other examples, the functionalities of any of the engines may be implemented in the form of electronic circuitry.

Figure 4:
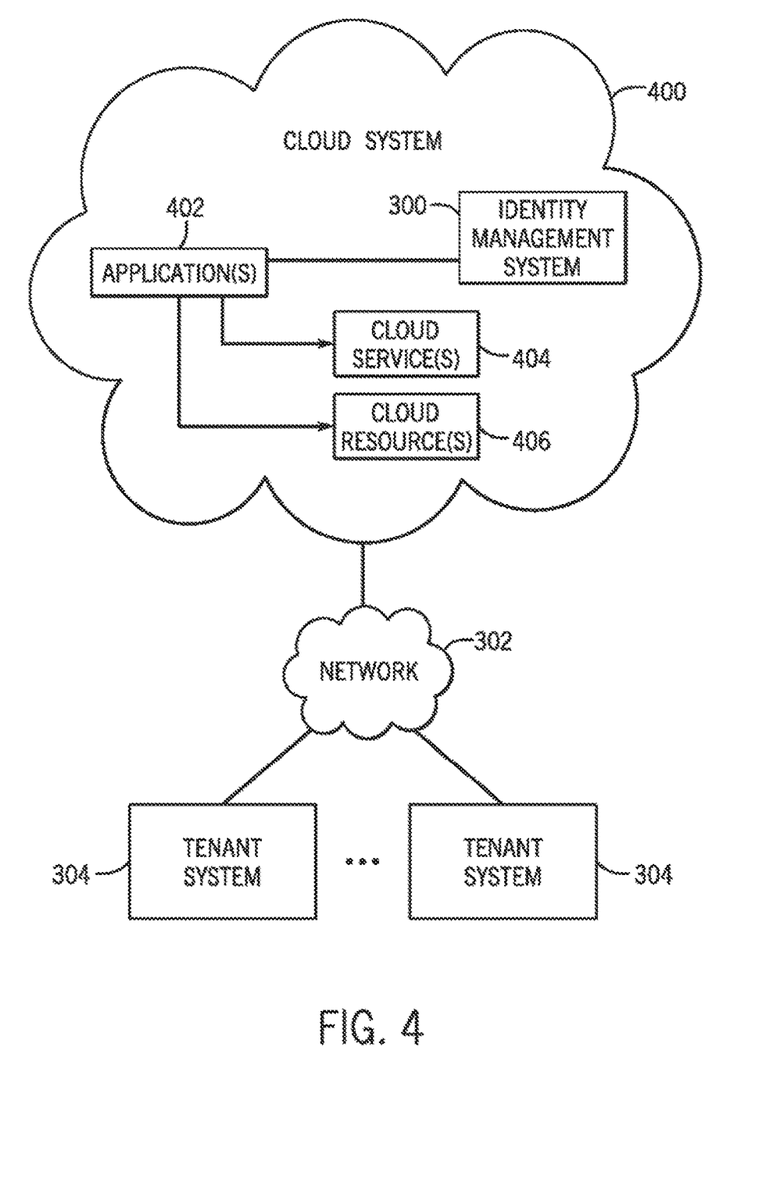
FIG. 4 is a block diagram of an example arrangement that includes a cloud system and tenant systems, according to further implementations.

FIG. 4 is a block diagram of another example arrangement, which includes a cloud system 400 that is coupled over the network 302 to the tenant systems 304. The cloud system 400 includes the identity management system 300 discussed in connection with FIG. 3. In addition, the cloud system 400 includes one or multiple applications 402 that manage access to cloud service(s) 404 and cloud resource(s) 406. The cloud service(s) 404 and cloud resource(s) 406 can be accessed on demand by the tenant systems 304, by accessing the application(s) 402.

Figure 5:
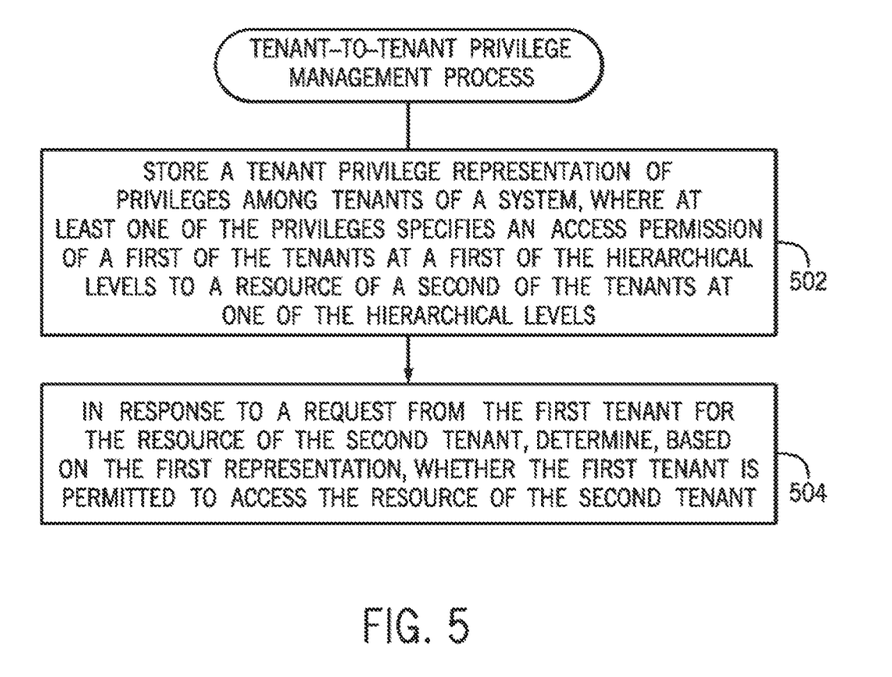
FIG. 5 is a flow diagram of a tenant-to-tenant privilege management process, according to some implementations.

FIG. 5 is a flow diagram of a tenant-to-tenant privilege management process, which can be performed by the tenant-to-tenant privilege management engine 314 according to some examples. The tenant-to-tenant privilege management engine 314 stores (at 502) the tenant privilege representation 310 (FIG. 3) of privileges among tenants in the tenant information repository 308. At least one of the privileges of the representation 310 specifies an access permission of a first tenant at a first hierarchical level to a resource of a second tenant at a hierarchical level (which can be the same as or different from the first hierarchical level). In addition, other privileges can also be specified, including those listed above.

In response to a request from the first tenant for the resource of the second tenant, the tenant-to-tenant privilege management engine 314 can determine (at 504), based on the tenant privilege representation 310, whether the first tenant is permitted to access the resource of the second tenant. In other examples, the request from the first tenant may be a request to add a sub-tenant of the second tenant, or to remove a sub-tenant from the second tenant, or to perform another task with respect to the second tenant. In response to such other request, the tenant-to-tenant privilege management engine 314 can similarly consult the tenant privilege representation 310 to determine whether or not the request can be granted.

The tenant privilege representation 310 can be specified using an access control mechanism, which can include one or multiple access control lists (ACLs). For example, an ACL may be associated with each of the tenants, where the ACL of a given tenant can specify what other tenant(s) has privileges with respect to the given tenant, and what those privileges are.

As further examples, a cryptographic mechanism can be used to specify relationships among the tenants. For example, the cryptographic mechanism can prevent unauthorized access of a resource of a tenant by another tenant. The cryptographic mechanism can include one or some combination of the following. In some examples, to access a resource of a given tenant, an access credential would have to be used. This access credential can be encrypted, and only specific tenants are provided an encryption key to decrypt the encrypted access credential. A tenant that has the encryption key for decrypting the encrypted access credential would be able to access the resource of the given tenant.

As further examples, digitally signed access policies and enforcement based on these signatures can be employed. As an example, a policy administration and enforcement mechanism such as an eXtensible Access Control Markup Language (XACML) mechanism can be used. Such a mechanism can include a policy administration point that creates an authorization policy in the form of a digitally signed access policy. When a first tenant wishes to access a resource of a second tenant, a policy decision point can decide based on the digitally signed access policy presented by the first tenant whether such an access request can be granted. A digital signature applied to the access policy beforehand by the policy administration point allows the policy decision point to validate the access policy independently from the policy administration point. The digital signature can be an asymmetric digital signature (e.g. Digital Signature Algorithm or DSA signature), in which case the policy administration point and the policy decision point do not have to share a common cryptographic secret.

As yet further examples, access policies that have been protected using a hash message authentication code (HMAC) can be used, and enforcement can be based on the HMACs. Instead of protecting an access policy as described above by using asymmetric digital signatures, a policy administration point and a policy decision point can share a common cryptographic secret, which allows validation of access policies using a symmetric HMAC technique, such as described in Request for Comments (RFC) 2104, entitled "HMAC: Keyed-Hashing for Message Authentication," dated in February 1997.

Figure 6:
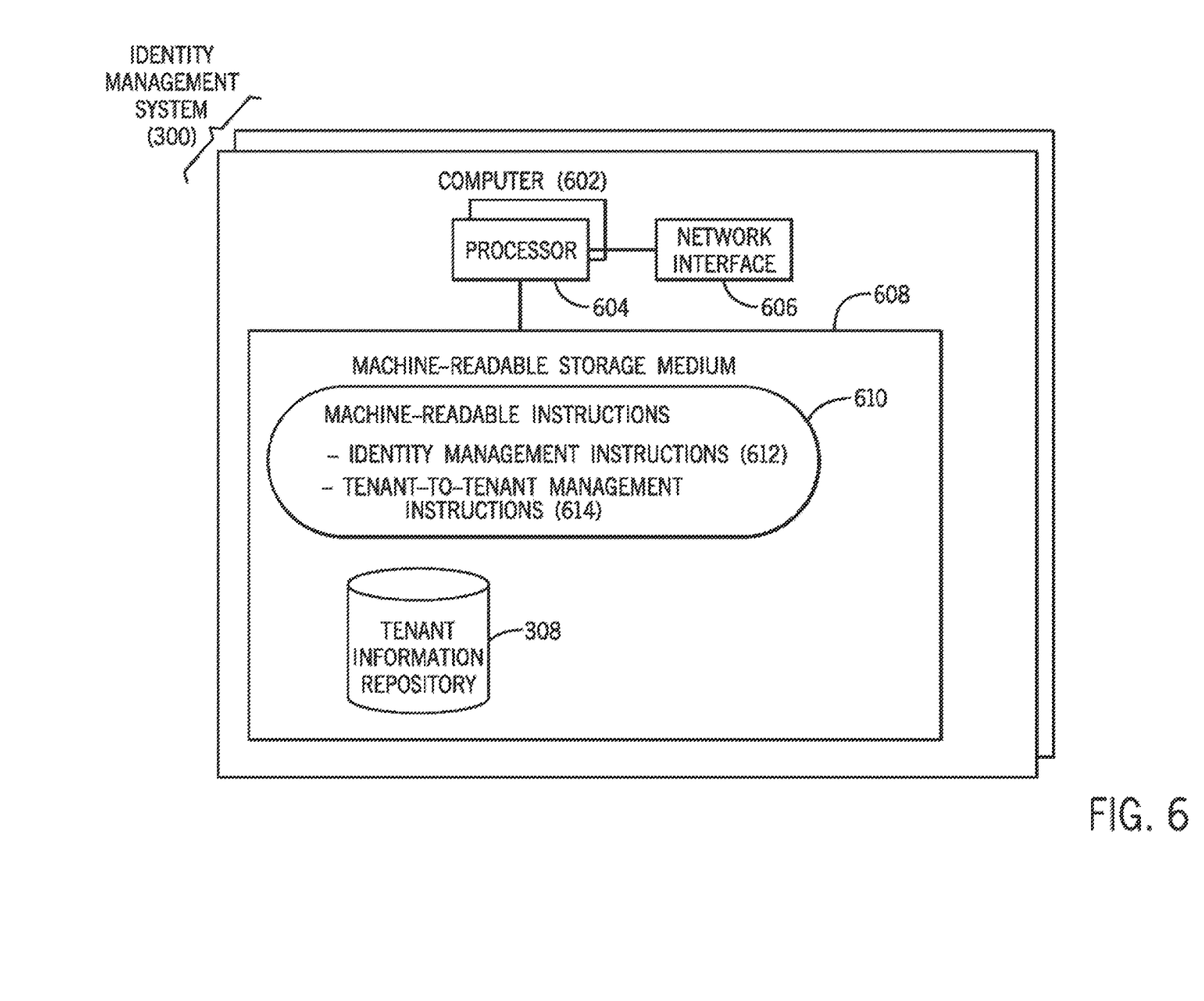
FIG. 6 is a block diagram of an example system according to some implementations.

FIG. 6 is a block diagram of an example identity management system 300 that includes one or multiple computers 602, according to some implementations. Each computer 602 includes one or multiple processors 604, which can be connected to a network interface 606 to allow the computer 602 to communicate over a data network.

The processor(s) 604 can be coupled to a non-transitory machine-readable storage medium (or storage media) 608, which can store instructions and other information. The instructions can include machine-readable instructions 610, which can include identity management instructions 612 (that are part of the identity management engine 306 of FIG. 3) and tenant-to-tenant management instructions 614 (that are part of the tenant-to-tenant management engine 314 of FIG. 4). The machine-readable instructions 610 are executable on the processor(s) 604. A processor can include a microprocessor, microcontroller, processor module or subsystem, programmable integrated circuit, programmable gate array, or another control or computing device.

The storage medium (or storage media) 608 can also store the tenant information repository 308 discussed above. As used herein, a "machine-readable storage medium" may be any electronic, magnetic, optical, or other physical storage apparatus to contain or store information such as executable instructions, data, and the like. For example, any machine-readable storage medium described herein may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
storing, by a system including a processor, a first representation of privileges among a plurality of tenants of the system, the plurality of tenants having relationships according to a hierarchy that includes a plurality of hierarchical levels of the tenants, wherein at least one of the privileges specifies an access permission of a first of the tenants at a first of the hierarchical levels to a resource of a second of the tenants at one of the hierarchical levels, and wherein the first representation is independent of a representation of the relationships among the plurality of tenants;
in response to a request from the first tenant for the resource of the second tenant, determining, by the system based on the first representation, whether the first tenant is permitted to access the resource of the second tenant; and
dynamically modifying the first representation to change the privileges among the plurality of tenants, without changing the representation of the relationships among the plurality of tenants.

2. The method of claim 1, wherein the at least one privilege specifies the access permission of the first tenant to the resource of the second tenant at a second, different one of the hierarchical levels.

3. The method of claim 1, wherein the at least one privilege specifies the access permission of the first tenant to user identity data of the second tenant, the user identity data for authorizing access of a cloud service or cloud resource provided by the system.

4. The method of claim 3, further comprising:
granting, by the system, access of the first tenant to the cloud service or the cloud resource in response to the user identity data of the second tenant.

5. The method of claim 1, wherein a second of the privileges specifies a permission of the first tenant to modify the second tenant, the method further comprising:
in response to a request by the first tenant to modify the second tenant, determining, by the system based on the first representation, whether the first tenant is permitted to modify the second tenant.

6. The method of claim 5, wherein the second privilege specifies a permission of the first tenant to modify the second tenant by adding or removing a sub-tenant of the second tenant.

7. The method of claim 1, wherein storing the first representation comprises storing access control information in at least one access control list.

8. The method of claim 1, wherein storing the first representation comprises using a cryptographic mechanism to control the privileges.

9. The method of claim 1, wherein the storing and the determining are performed by an identity management system that performs authorization of access of a cloud service or cloud resource of the system.

10. The method of claim 1, further comprising:
granting, by the system, access of the resource in response to the at least one privilege represented by the first representation indicating that the first tenant is permitted to access the resource of the second tenant; and
preventing, by the system, access of the resource in response to the at least one privilege represented by the first representation indicating that the first tenant is not permitted to access the resource of the second tenant.

11. The method of claim 10, wherein the resource of the second tenant is selected from among a processing resource, a storage resource, and a communication resource.

12. A system comprising:
at least one hardware processor to:
receive a request from a first tenant of the system to perform a task with respect to a second tenant of the system;
in response to the request, access a first representation of privileges among a plurality of tenants, the plurality of tenants having relationships according to a hierarchy that includes a plurality of hierarchical levels of the tenants, wherein the privileges specify permissions of the tenants at the respective hierarchical levels to perform tasks with respect to other tenants at the respective hierarchical levels, and wherein the first representation is independent of a representation of the relationships among the plurality of tenants;
determine, based on the first representation, whether the first tenant is permitted to perform the task with respect to the second tenant;
grant the first tenant permission to perform the task with respect to the second tenant in response to a first permission represented by the first representation specifying that the first tenant is permitted to perform the task with respect to the second tenant; and
in response to a request by the first tenant to modify the second tenant, determine, by the system based on a second permission represented by the first representation, whether the first tenant is permitted to modify the second tenant, the second permission specifying a permission of the first tenant to modify the second tenant.

13. The system of claim 12, wherein the determining of whether the first tenant is permitted to perform the task with respect to the second tenant comprises determining whether the first tenant is permitted to access a resource of the second tenant and wherein the granting of the first tenant permission to perform the task with respect to the second tenant comprises granting the first tenant permission to access the resource of the second tenant.

14. The system of claim 12, wherein determining whether the first tenant is permitted to perform the task with respect to the second tenant comprises determining whether the first tenant is permitted to add or remove a sub-tenant of the second tenant.

15. The system of claim 12, wherein the system is a cloud system, and the cloud system further comprising an identity management engine including the at least one hardware processor, the at least one hardware processor of the identity management engine to authorize access of a cloud service or cloud resource of the cloud system by a user of one of the plurality of tenants based on the task performed by the first tenant with respect to the second tenant.

16. The system of claim 15, wherein the task performed by the first tenant with respect to the second tenant comprises the first tenant accessing user identity data of the second tenant, and wherein the at least one processor of the identity management engine is to grant access of the cloud service or the cloud resource by the user of one of the plurality of tenants based on the user identity data accessed by the first tenant.

17. The system of claim 12, wherein the first representation includes a tenant privilege hierarchy that specifies privilege relationships among the plurality of tenants, the tenant privilege hierarchy including the plurality of hierarchical levels.

18. An article comprising at least one non-transitory machine-readable storage medium storing instructions that upon execution cause a cloud system to:
receive a request from a first tenant of the cloud system to perform a task with respect to a second tenant of the cloud system, the cloud system including a cloud resource or a cloud service shareable by a plurality of tenants, and the cloud system further including an identity management system to authorize access of at least one of the cloud resource or the cloud service;
in response to the request, access a first representation of privileges among the plurality of tenants, the plurality of tenants having relationships according to a hierarchy that includes a plurality of hierarchical levels of the tenants, wherein the privileges specify permissions of the tenants at the respective hierarchical levels to perform tasks with respect to other tenants at the respective hierarchical levels, and wherein the first representation is independent of a representation of the relationships among the plurality of tenants;
determine, based on the first representation, whether the first tenant is permitted to perform the task with respect to the second tenant;
grant access to the cloud resource or the cloud service to the first tenant based on the task performed by the first tenant with respect to the second tenant; and dynamically modify the first representation to change the privileges among the plurality of tenants, without changing the representation of the relationships among the plurality of tenants.

19. The article of claim 18, wherein the task performed by the first tenant with respect to the second tenant comprises the first tenant accessing user identity data of the second tenant, and wherein the granting of the access to the cloud resource is based on the user identity data of the second tenant.

* * * * *

UNITED STATES PATENT AND TRADEMARK OFFICE
CERTIFICATE OF CORRECTION

Page 1 of 1

PATENT NO. : 10,218,703 B2
APPLICATION NO. : 15/112394
DATED : February 26, 2019
INVENTOR(S) : Michael B Beiter It is certified that error appears in the above-identified patent and that said Letters Patent is hereby corrected as shown below:

On the Title Page

On page 2, in item (56), FOREIGN PATENT DOCUMENTS, in Column 2, Line 1, delete "WO-20030998483" and insert -- WO-2003098483 --, therefor.

In the Claims

In Column 10, Line 12, in Claim 13, delete "tenant" and insert -- tenant, --, therefor.

Signed and Sealed this
Third Day of December, 2019

Andrei Iancu
*Director of the United States Patent and Trademark Office*